United States Patent
Lundberg et al.

(10) Patent No.: US 11,825,241 B2
(45) Date of Patent: Nov. 21, 2023

(54) CAMERA AND A METHOD THEREIN FOR FACILITATING INSTALLATION OF THE CAMERA

(71) Applicant: Axis AB, Lund (SE)

(72) Inventors: Stefan Lundberg, Lund (SE); Carl-Axel Alm, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/524,063

(22) Filed: Nov. 11, 2021

(65) Prior Publication Data
US 2022/0201253 A1    Jun. 23, 2022

(30) Foreign Application Priority Data

Dec. 22, 2020 (EP) .................................... 20216460

(51) Int. Cl.
*H04N 7/18* (2006.01)
*G06V 20/10* (2022.01)
*H04N 23/667* (2023.01)

(52) U.S. Cl.
CPC ............. *H04N 7/181* (2013.01); *G06V 20/10* (2022.01); *H04N 23/667* (2023.01)

(58) Field of Classification Search
CPC .... H04N 7/181; H04N 5/23245; H04N 7/188; G06V 20/10; G08B 13/1964; B60R 2300/105
USPC ......................................................... 348/159
See application file for complete search history.

(56) References Cited

U.S. PATENT DOCUMENTS

| | | | |
|---|---|---|---|
| 10,755,388 B2 | 8/2020 | Nystrom et al. | |
| 2005/0162515 A1 | 7/2005 | Venetianer et al. | |
| 2007/0127774 A1* | 6/2007 | Zhang ............... | G08B 13/19602 382/103 |
| 2007/0146386 A1* | 6/2007 | Loce ..................... | G06T 11/203 345/611 |

(Continued)

FOREIGN PATENT DOCUMENTS

| | | |
|---|---|---|
| CN | 110738142 A | 1/2020 |
| EP | 2157781 A1 | 2/2010 |

(Continued)

OTHER PUBLICATIONS

Extended European Search Report dated May 19, 2021 for European Patent Application No. 20216460.4.

*Primary Examiner* — Thai Q Tran
*Assistant Examiner* — Nienru Yang
(74) *Attorney, Agent, or Firm* — Volpe Koenig (57) ABSTRACT

There is provided a camera and a method therein for facilitating installation of the camera. The method comprises capturing a video stream of a scene when the camera is installed with a first FOV, which scene comprises an object. A size in the video stream of at least one part of the object is estimated. As long as the estimated size is above a first threshold and below a second threshold, providing a first, edge-filtered, version of the video stream to secure privacy of the object. In response to the estimated size being above the second threshold indicating that the privacy is at risk of being revealed, entering an enhanced secure privacy mode comprising generating an alert to prompt an installer to re-install the camera with a second FOV different from the first FOV, and disabling provision of the first, edge-filtered, version of the video stream.

14 Claims, 7 Drawing Sheets

(56) References Cited

U.S. PATENT DOCUMENTS

| | | | |
|---|---|---|---|
| 2010/0124271 A1* | 5/2010 | Martz | H04N 5/77 |
| | | | 375/E7.076 |
| 2010/0124363 A1 | 5/2010 | Ek et al. | |
| 2012/0176517 A1 | 7/2012 | Lee | |
| 2014/0362215 A1 | 12/2014 | Yoshio et al. | |
| 2016/0133021 A1 | 5/2016 | Gouda et al. | |
| 2018/0025649 A1* | 1/2018 | Contreras | G06T 5/002 |
| | | | 701/3 |
| 2018/0047167 A1* | 2/2018 | Xu | G06T 7/12 |
| 2018/0359449 A1* | 12/2018 | Matsumoto | G08B 13/19686 |

FOREIGN PATENT DOCUMENTS

| | | |
|---|---|---|
| JP | 2008-160354 A | 7/2008 |
| JP | 2010-081428 A | 4/2010 |
| JP | 2020-039480 A | 3/2020 |
| KR | 101215948 B1 | 12/2012 |

* cited by examiner

CAMERA AND A METHOD THEREIN FOR FACILITATING INSTALLATION OF THE CAMERA

FIELD OF INVENTION

The present invention relates to a camera and a method therein for facilitating installation of the camera.

TECHNICAL BACKGROUND

When installing a camera, such as a monitoring camera, to capture images of a scene, national privacy regulations may require that privacy of one or more objects present in the scene should be guaranteed. Privacy is typically achieved by distortion of the captured images such that object recognition or object identification is prevented. Thus, by distorting the captured images facial recognition, identification of registration number of vehicles, etc. is prevented. If the privacy cannot be guaranteed the camera may not be allowed to be installed.

Methods for distorting captured images in order to prevent object recognition and objection identification are known. For example, U.S. Ser. No. 10/755,388 B2 describes how to protect personal privacy in captured image data by controlling privacy masking of an image, where the degree of blurring to be applied to a privacy area of the image depends on a threshold distance from the image capturing device, and the spatial resolution of content of the scene at this distance in the image. However, U.S. Ser. No. 10/755, 388 B2 is silent about how to facilitate installation of the camera to guarantee privacy.

US 2014/0362215 A1 relates to correction of a camera installation. However, in this disclosure the aim of the correction of the camera installation is to optimize face recognition in the captured images. Average size of faces is measured in different subregions and used as one parameter to trigger a change in camera position, such as moving the camera further from the scene or zooming in.

Thus, there is room for improvements in order to provide a facilitated installation of a camera fulfilling national privacy regulations.

SUMMARY

In view of the above, mitigating drawbacks with the prior art and to provide techniques for facilitating installation of a camera, and especially of a camera able to secure privacy when capturing video streams would be desirable.

According to a first aspect, the above is achieved by a method, performed by a camera, for facilitating installation thereof. The method comprises capturing a video stream of a scene when the camera is installed with a first field of view, which scene comprises one or more objects. The method further comprises estimating a size in the video stream of at least one part of the one or more objects, and as long as the estimated size in the video stream of the at least one part of the one or more objects is above a first threshold and below a second threshold, providing a first, edge-filtered, version of the video stream to secure privacy of the one or more objects depicted in the video stream. Furthermore, the method comprises, in response to the estimated size in the video stream of the at least one part of the one or more objects being above the second threshold indicating that privacy of at least one object is at risk of being revealed, entering an enhanced secure privacy mode of operation comprising generating an alert to prompt an installer to re-install the camera with a second field of view different from the first field of view, and disabling provision of the first, edge-filtered, version of the video stream.

By providing the first, edge-filtered, version of the video stream as long as the estimated size in the video stream of the at least one part of the one or more objects is above the first threshold and below the second threshold, the privacy of the one or more objects depicted in the video stream is secured thanks to the anonymization of the one or more objects provided by the first, edge-filtered, version of the video stream.

Further, by disabling the provision of the first, edge-filtered, version of the video stream when the estimated size in the video stream of the at least one part of the one or more objects being above the second threshold indicating that the privacy of at least one object is at risk of being revealed, the privacy of the one or more objects is secured.

By generating the alert to prompt the installer to re-install the camera when the estimated size in the video stream of the at least one part of the one or more objects being above the second threshold, the installer is made aware of a need to re-install the camera at a second field of view different from the first field of view in order to secure privacy in the future, i.e., in upcoming captures of video streams. Thus, the second field of view should be selected such that it will provide privacy of one or more objects captured in the video stream.

The term installation when used in this disclosure refers to the mounting of the camera at a location, e.g., a physical location, at the scene and/or the configuration of the camera to capture the video streams of the scene with a certain field of view. Thus, the installation may refer to the geographical location at which the camera is mounted and/or to camera settings, such as a certain pan, tilt and/or zoom setting, used for capturing the video streams.

As used herein, the term field of view refers to the part of the scene that is visible through the camera at a particular position and orientation in space of the camera and at a particular zoom setting of the camera. The particular position is given by the installation location and the orientation is given by the pan setting and/or tilt setting of the camera. Thus, it should be understood that the field of view may depend on one or more different camera parameters. For example, the field of view may depend on the installation location of the camera such as height above ground, the zoom setting of the camera the pan setting of the camera and/or the tilt setting of the camera.

The estimated size in the video stream of the at least one part of the one or more objects may be determined as a number of pixels the at least one part constitute along at least one direction of the video stream. For example, the estimated size of the at least one part may be given as a number of pixels in a vertical (height) direction and/or horizontal (width) direction of an image frame of the video stream. A pixel, sometimes referred to as a picture element, is the smallest single element in the image frame. Depending on the spatial resolution of the image frame, the image frame may comprise 1920×1080 (width×height) pixels, 2560× 1440 pixels, 2560×1920 pixels or 3840×2160 pixels, just to give some examples.

The first threshold may be zero pixels in case a first, edge-filtered, version of the video stream should be provided for all estimated sizes being below the second threshold. However, if the estimated size in the video stream of the at least one part of the one or more objects is small enough the captured video stream may be provided as it is without the risk of revealing privacy of the one or more objects. What should be considered as an estimated size small enough depends on the situation at hand, but the first threshold should be set to provide an upper threshold for when the video stream could be provided as it is without revealing privacy of the one or more objects depicted in the video stream. In such scenario, the first, edge-filtered, version of the video stream is provided when the estimated size in the video stream of the at least one part of the one or more objects is above the first threshold but below the second threshold.

The second threshold should be set to provide an upper threshold for when the first, edge-filtered, version of the captured video stream should be provided. Above this second threshold, the privacy of the one or more objects is at risk of being revealed if the first, edge-filtered, version of the video stream is provided and therefore the provision of the first, edge-filtered, version of the video stream is disabled.

The first and second thresholds may be determined based on camera parameters and installation location. For example, the thresholds may be determined based on the camera's optics such as the type of lens, and the camera's resolution and field of view. Additionally, or alternatively, the threshold may also be determined based on the edge-filter used to provide an edge-filtered version of the captured video stream and on the size of the edge-filter's kernel. The kernel is a small matrix used in edge detection when performing a convolution between the kernel and the image frame. Further, the first and second thresholds determined for camera installations in one country may be different from first and second thresholds determined for camera installations in another country due to differences in the countries' privacy regulations. The first and second thresholds may be determined by performing tests or based on first and second thresholds used in previous camera installations. The first and second thresholds may also be determined by means of machine-learning techniques, e.g., by means of a neural network configured to detect and/or recognize one or more objects in a video stream.

It should be understood that the video stream comprises at least one image frame of the scene. Thus, the video stream may comprise one image frame or a plurality of image frames, e.g., a plurality of temporally subsequent image frame.

The scene may be any three-dimensional physical space whose size and shape is defined by the field of view of a camera recording the scene.

By the term object when used herein is meant any kind of object that may reveal privacy information about the object itself, about a person being in possession of the object or about a person being associated with the object. Thus, the object may be a human person or a part thereof, such as a face or a body part; a group of people; a vehicle or a part thereof, such as a vehicle license plate, just to give some examples.

An edge-filtered version of the video stream is a version of the video stream wherein edge points have been enhanced and non-edge points have been suppressed. The edge points correspond to points in the image frame(s) of the video stream at which points the image brightness changes sharply or, more formally, has discontinuities. In correspondence, the non-edge points correspond to pixels in the image frame(s) at which points the image brightness does not change sharply or, more formally, does not has discontinuities. In the edge-filtered version of the video stream, the edge points are enhanced and are usually shown as a set of connected curves that indicate the boundaries of objects, the boundaries of surface markings and/or a set of curves that correspond to discontinuities in surface orientation. Since the non-edge points are suppressed in the edge-filtered version of the video stream, the points within the boundaries enhanced by the edge-points are suppressed. For example, if contours of a face are enhanced in an edge-filtered version of the video stream, the surface texture within the contours of the face would be suppressed, resulting in a degree of anonymisation of the face. The degree of anonymisation depends on the degree of enhancement and the degree of suppression in the edge-filtered version of the video stream. However, it should be understood that the degree of anonymisation also depends on the spatial resolution of the video stream.

In some variants of the method, the enhanced secure privacy mode of operation comprises providing a second version of the video stream in which the privacy of the one or more objects is further secured.

By providing the second version of the video stream in which the privacy of the one or more objects is further secured, the privacy of the one or more objects can be guaranteed when it couldn't be guaranteed in the first, edge-filtered, version of the video stream which therefore is disabled. Thereby, the second version of the video stream can be provided to a user for monitoring or to a storage for storage without revealing any privacy sensitive information.

In some variants of the method, the providing of the second version of the video stream comprises producing the second version of the video stream by applying a privacy mask to at least a part of the video stream to secure privacy of the one or more objects depicted in the video stream.

This is a first alternative way of providing the second version of the video stream to guarantee the privacy of the one or more objects.

By the term privacy mask when used in this disclosure should be understood as a privacy masking feature used to protect personal privacy by concealing parts of an image frame from view with a masked area. A privacy mask may be static or dynamic. Static privacy masks typically stay in place until the operator decides to move or remove them. Dynamic privacy masks may change over time, and the operator may also define when the privacy mask should be applied. For instance, the operator could define a dynamic privacy mask such that if a face is detected within the masked area, the face will be masked out, but otherwise no mask will be applied to the area.

Privacy masks are often applied to the image as an overlay. The privacy mask may have a polygonal shape, but other shapes are also possible, which more closely follow the shape of the area to occlude. Some privacy masks take the form of an opaque area (e.g., a uniformly black or blue area), while other privacy masks take the form of blurring, where image data is "smeared" out over the privacy mask area, or pixilation. Pixilation is a process where a single pixel value (often an average value of several or all the pixels within a coding unit) replaces all the pixels in a coding unit. Pixilation may be achieved by downscaling the image frame a factor between e.g., 8 and 64, and thereafter upscaling the image frame using a trivial scaling algorithm, such as nearest neighbour algorithm. In general, though, blurring for privacy masking is considered more desirable than pixilation as it allows for smoother edges and is therefore nicer looking. However, blurring is more difficult to a achieve and requires more computational resources to implement than what is currently economically viable in a hardware block.

In a video stream, the privacy mask is applied to each image frame of the video stream to conceal privacy of the one or more objects depicted in the video stream. For example, the privacy mask may be applied to a face or a body part of a human person and thereby conceal those parts from view and identification. The privacy mask may be applied to the at least one part of the video stream, by determining an area covering the one or more objects depicted in the video stream and by presenting the area using a solid colour, blurring or pixilation as mentioned above. The area may for example be determined as the outlines of the one or more objects. However, the area may have another shape, e.g., circular, rectangular, oval, suitable for covering the at least one part of the video stream.

In some variants of the method, the providing of the first, edge-filtered, version of the video stream comprises producing the first, edge-filtered, version of the video stream by applying an edge filter to the video stream to enhance edge points in the video stream and to suppress non-edge points in the video stream, wherein pixel values of the video stream are represented using a first number of quantization levels.

As mentioned above, by producing the first, edge-filtered, version of the video stream, the privacy of the one or more objects depicted in the video stream is secured thanks to the anonymization of the one or more objects provided by the first, edge-filtered, version of the video stream.

The edge filter is a filter that enhances edge points and suppresses non-edge points. Thus, by applying the edge filter to the video stream edge points will be enhanced while non-edge points will be suppressed. For example, the edge filter, sometimes also referred to as an edge detection filter, may be a Sobel filter, a Canny filter, a Difference of Gaussian (DoG) filter, a Laplacian filter, a Prewitt filter, or a Scharr filter, just to give some examples. In order to fit the use case, the output of the edge filter, i.e., the edge-filtered version of the video stream, may be modified using one or more operations, such as an absolute-value operation to not differentiate between positive and negative gradients, a gain operator to adjust strength, an offset operator to make edge points black and non-edge points white, and/or a noise reduction operator to remove unnecessary sparse black edge pixels not part of real edges or other structures in the image.

As mentioned above, pixels in the video stream will be represented using a first number of quantization levels. For example, the pixels may be represented using 8 bits corresponding to 256 quantization levels. Thus, each pixel may take a value between 0 and 255 to represent one of the 256 possible colours. After applying an edge filter to a video stream, the resulting edge-filtered version of the video stream is usually composed of pixels having a value on a greyscale meaning that they are only representing an amount of light, that is, each pixel represents only intensity information. In case of an 8 bits representation, each pixel of the edge-filtered version of the video stream will be able to represent a level of intensity between 0 and 255 using a greyscale. Thus, if 0 is represented by white and 255 by black, there is 254 shades of grey in between.

In some variants of the method, the providing of the second version of the video stream comprises producing the second version of the video stream as a second, edge-filtered, version of the video stream by, before applying the edge filter to the video stream, reducing the spatial resolution of the video stream in order to reduce the size in the video stream of the at least one part of the one or more objects to be below the second threshold.

This is a second alternative way of providing the second version of the video stream to guarantee the privacy of the one or more objects. For some uses cases, this may be an effective way to guarantee the privacy of the one or more objects.

The term spatial resolution when used herein refers to the number of pixels utilized in construction of the video stream, e.g., in construction of one or more image frames of the video stream. By reducing the spatial resolution of the video stream, the number of pixels composing the one or more image frames of the video stream is reduced. This is sometimes referred to as downscaling or downsampling. In correspondence, by increasing the spatial resolution of the video stream, i.e., by upscaling/upsampling the video stream, the number of pixels composing the one or more image frames of the video stream is increased. It should be understood that the size of each pixel remains the same resulting in a reduced image size when the spatial resolution is reduced and in an increased image size when the spatial resolution is increased. Thereby, the video streams, e.g., the original captured video stream, the first version of the video stream and the second version of the video stream will all have the same pixel size if provided to a user irrespective of the level of privacy. However, it should be understood that after downscaling of a video stream, upscaling of the video stream may be performed to keep the video stream with the same number of pixels but with less sensitive information since image details are lost during downscaling.

By reducing the spatial resolution of the video stream so that the size in the video stream of the at least one part of the one or more objects to be below the second threshold it is guaranteed that privacy of the one or more objects is obtained in the second, edge-filtered, version of the video stream.

In some variants of the method, the providing of the second version of the video stream comprises producing the second version of the video stream as a second, edge-filtered, version of the video stream by, before applying the first edge filter to the video stream, reducing the number of quantization levels used to represent pixel values of the video stream from the first number of quantization levels to a second number of quantization levels.

This is a third alternative way of providing the second version of the video stream to guarantee the privacy of the one or more objects. It should be understood that pixel values in the second, edge-filtered, version of the video stream will be represented using the second number of quantization levels.

By reducing the number of quantization levels in the video stream from the first number of quantization levels to a second, lower, number of quantization levels, the granular distortion in the second, edge-filtered, version of the video stream will be increased due to the larger number of intensities to be represented by each quantization level in the second number of quantization levels as compared to the number of intensities to be represented by each quantization level in the first number of quantization levels. Thanks to a larger granular distortion, the privacy of the one or more objects depicted in the second, edge-filtered, version of the video stream is secured.

For example, if the first number of quantization levels was 256 as mentioned above using the 8 bits representation, the number of second quantization levels may be 4 (using a 2 bits representation). In such case, the 256 quantization levels of the first number of quantization levels each representing one intensity, are grouped into four groups of 64 quantization levels. The first group may be combined into a first quantization level (e.g., 0) of the second number of the quantization levels. Thus, this first quantization level (e.g., 0) of the second number of the quantization levels will represent each one of the 64 different intensities represented by the quantization levels 0-63 of the first number of quantization levels. Therefore, in the second, edge-filtered, version of the video stream it will not be possible to see any differences between the 64 different intensities represented by the quantization levels 0-63 of the first number of quantization levels in the first, edge-filtered, version of the video stream. In correspondence, the second group may be combined into a second quantization level (e.g., 1) of the second number of the quantization levels, and this second quantization level (e.g., 1) will represent each one of the 64 different intensities represented by the quantization levels 64-127 of the first number of quantization levels. Therefore, in the second, edge-filtered, version of the video stream it will not be possible to see any differences between the 64 different intensities represented by the quantization levels 64-127 of the first number of quantization levels in the first, edge-filtered, version of the video stream. The same is true for the third and four groups.

In some variants of the method, providing the second version of the video stream comprises producing the second version of the video stream as a second, edge-filtered, version of the video stream by, reducing the spatial resolution of the first, edge-filtered, version of the video stream to obtain the second, edge-filtered, version of the video stream wherein the size of the at least one part of the one or more objects is below the second threshold.

This is a fourth alternative way of providing the second version of the video stream to guarantee the privacy of the one or more objects.

By reducing the spatial resolution of the first, edge-filtered, version of the video stream to obtain the second, edge-filtered, version of the video stream wherein the size of the at least one part of the one or more objects is below the second threshold, the privacy of the one or more objects is secured.

In some variants of the method, the providing of the second version of the video stream comprises producing the second version of the video stream as a second, edge-filtered, version of the video stream by representing edge points having an edge strength below an edge strength threshold in the first, edge-filtered, version of the video stream as non-edge points in the second, edge-filtered, version of the video stream.

This is a fifth alternative way of providing the second version of the video stream to guarantee the privacy of the one or more objects. By representing edge points having an edge strength below the edge strength threshold in the first, edge-filtered, version of the video stream as non-edge points in the second, edge-filtered, version of the video stream, the contours of the one or more objects are further enhanced while the surface texture within the contours of the one or more objects are further suppressed. That results in a higher degree of anonymisation of the one or more objects and thereby secures the privacy of the one or more objects. The expression "edge strength" refers to a measure of the edge and how sharply the image brightness changes at the edge.

In some variants of the method, providing the first, edge-filtered, version of the video stream comprises transmitting the first, edge-filtered, version of the video stream to a receiver; and disabling provision of the first, edge-filtered, version of the video stream comprises disabling transmission of the first, edge-filtered, version of the video stream to the receiver.

The receiver may be any device operatively connected, via wire or wirelessly, to the camera either directly or indirectly via a network. For example, the receiver may be a storage, a user terminal, a server or a cloud device.

In some variants of the method, disabling provision of the first, edge-filtered, version of the video stream comprises disabling the camera from capturing the video stream. By disabling the camera from capturing the video stream means that the capturing of the video stream is terminated. Thereby, there is no captured video stream that may risk revealing the privacy of the one or more objects if provided.

In some variants of the method, disabling provision of the first, edge-filtered, version of the video stream comprises disabling an image sensor of the camera to convey image information used to make the captured video stream.

By disabling the image sensor to convey image frames used to make the captured video stream, there is no image information to process and thus no captured video stream that may reveal privacy if provided.

In some variants of the method, the method further comprises when the estimated size in the video stream of the at least one part of the one or more objects is below the first threshold, providing the captured video stream.

Thus, when the size in the video stream of the at least one part of the one or more objects is below the first threshold, it is concluded that the captured video stream would not reveal privacy if it is provided as it is. Therefore, the captured video stream is provided when the size in the video stream of the at least one part of the one or more objects is below the first threshold.

According to a second aspect, the above is achieved by a camera for facilitating installation thereof. The camera comprises an image capturing module configured to capture a video stream of a scene when the camera is installed with a first field of view, which scene comprises one or more objects; a size estimating component configured to estimate a size in the video stream of at least one part of the one or more objects; a providing component configured to, as long as the estimated size in the video stream of the at least one part of the one or more objects is above a first threshold and below a second threshold, provide a first, edge-filtered, version of the video stream to secure privacy of the one or more objects depicted in the video stream. In response to the estimated size in the video stream of the at least one part of the one or more objects being above the second threshold indicating that privacy of at least one object is at risk of being revealed, the camera is configured to enter an enhanced secure privacy mode of operation wherein an alert generating component is configured to generate an alert to prompt an installer to re-install the camera with a second field of view different from the first field of view, and wherein the providing component is configured to disable provision of the first, edge-filtered, version of the video stream.

According to a third aspect, the above is achieved by a non-transitory computer-readable medium having stored thereon computer code instructions adapted to carry out the method of the first aspect when executed by a device having processing capability.

The second and third aspects may generally have the same features and advantages as the first aspect. It is further noted that the concepts herein to all possible combinations of features disclosed herein unless explicitly stated otherwise.

BRIEF DESCRIPTION OF THE DRAWINGS

The above, as well as additional objects, features and advantages, will be better understood through the following illustrative and non-limiting detailed description of embodiments, with reference to the appended drawings, where the same reference numerals will be used for similar elements, wherein.

DETAILED DESCRIPTION

The present teachings will be described more fully hereinafter with reference to the accompanying drawings, in which embodiments are shown.

Figure 1:
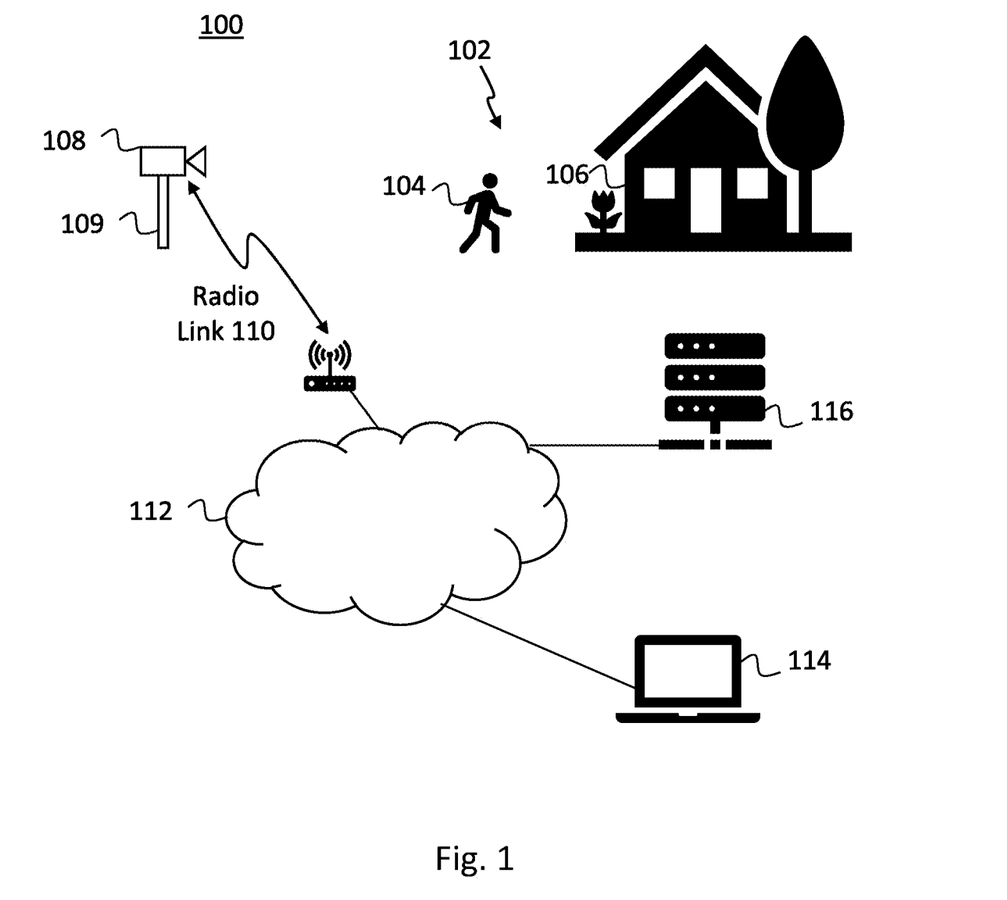
FIG. 1 schematically an exemplary environment in which various embodiments can be implemented.

FIG. 1 shows a schematic diagram of an exemplary environment 100 in which various embodiments can be implemented. As can be seen in FIG. 1, a scene 102 with an object 104, e.g., a person walking towards a building 106 is captured by a camera 108 mounted at a pole 109. It should be noted that the depiction of the scene 102 is merely a simplistic view for illustrative purposes. A scene 102 can be described, in a more general sense as any three-dimensional physical space whose size and shape is defined by the field of view of a camera recording the scene. Further, it should be understood that the camera 108 may be mounted at other suitable places, such as on a building, in a ceiling, on a wall or a fence, and thus that the mounting at the pole 109 is just given as an example.

The camera 108 may be a monitoring camera, sometimes also referred to as surveillance camera. Further, the camera may be a fixed camera, e.g., a stationary camera, or a movable camera, e.g., a pan, tilt and zoom (PTZ) camera or a body worn camera (BWC). The camera 108 may be a visible light camera, an infrared (IR) sensitive camera or a thermal (long-wavelength infrared (LWIR)) camera.

As illustrated in FIG. 1, the camera 108 is configured to transmit the video streams wirelessly over a radio link 110 to a wired network 112, and eventually to a client 114 and/or a server 116, which may be connected to the network 112. It should be understood that there are many combinations of wireless and wired transmission models that can be used, and that FIG. 1 only illustrates one example.

The client 114 may have a display where an operator can view images and/or video streams from the camera. Typically, the client 114 is also connected to the server 116, where the images and/or video streams can be stored and/or processed further. Often, the client 114 is also used to control the camera 108, for example, by the operator issuing control commands at the client 114. For example, an operator may instruct the camera to zoom out on a particular detail of the scene 102. This may be the case when a size in the video stream of a part of the one or more objects 104 are estimated to be above a second threshold when capturing video streams using a first field of view, e.g., a first zoom setting, and an alert is generated to an installer who can instruct the camera to zoom out on the part of the one or more objects to reduce the size in the video stream of the part to be below the second threshold when capturing video streams using a second field of view, e.g., a second zoom setting, that is different from the first field of view. Thereby privacy of the one or more objects can be secured. However, there are also situations in which an operator does not control the camera, but the camera 108 is stationary and merely provides the video stream for the operator to view on the client 120. In such scenario, the installer may need to re-install the camera 108 at another physical location in order to obtain the second field of view in which the size in the video stream of the part is below the second threshold when capturing video streams using this second field of view. Thus, a re-installation of the camera 108 at a different physical location may also obtain the sought-after secured privacy of the one or more objects. The different physical location may be a location at a larger distance from the one or more objects as compared to the distance to the one or more objects when installed with the first field of view.

Figure 2:
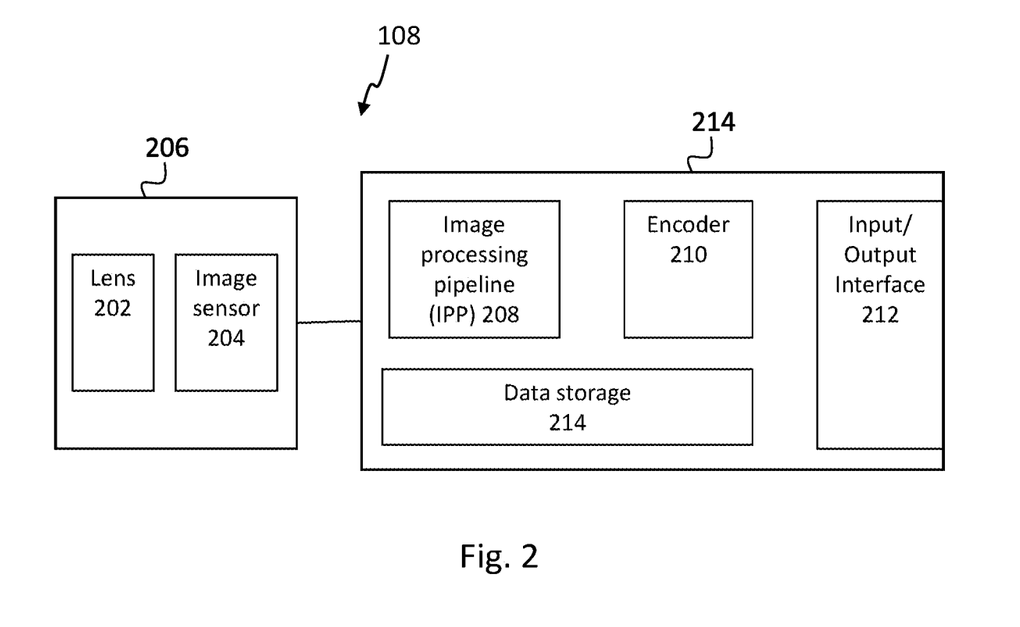
FIG. 2 schematically illustrates a camera according to embodiments.

FIG. 2 schematically illustrates embodiments of the camera 108.

The camera 108 comprises a lens 202 that captures the scene 102 and projects it onto an image sensor 204. Together, the lens 202 and image sensor 204 may form an image capturing module 206. The image sensor 204 captures image frames forming video streams. The camera comprises further an image processing pipeline (IPP) 208, an encoder 210 and an input/output interface 212.

The image processing pipeline 208 is configured to perform a range of various operations on image frames received from the image sensor 204. Such operations may include filtering, demosaicing, colour correction, noise filtering for eliminating spatial and/or temporal noise, distortion correction for eliminating effects of e.g., barrel distortion, global and/or local tone mapping, e.g., enabling imaging of scenes containing a wide range of intensities, transformation, e.g., rotation, flat-field correction, e.g., for removal of the effects of vignetting, application of overlays, e.g., privacy masks, explanatory text, etc. However, it should be noted that some of these operations, e.g., transformation operations, such as correction of barrel distortion, rotation, etc., may be performed by one or more modules, components or circuits arranged outside the image processing pipeline 208, for example in one or more units between the image processing pipeline 208 and the encoder 210.

Following the image processing pipeline 208, the image frames are forwarded to the encoder 210, in which the image frames are encoded according to an encoding protocol and forwarded to a receiver, e.g., the client 114 and/or the server 116, over the network 112 using the input/output interface 212. It should be noted that the camera 108 illustrated in FIG. 2 also includes numerous other components, such as processors, memories, etc., which are common in conventional camera systems and whose purpose and operations are well known to those having ordinary skill in the art. Such components have been omitted from the illustration and description of FIG. 2 for clarity reasons.

The camera 108 may also comprise a data storage 214 for storing data relating to the capturing of the video stream and data relating to the method for facilitating installation of the camera 108. Thus, the data storage may store the captured video stream, first and second versions of the video stream, first and second thresholds, first and second field of views, estimated size in the video stream of at least one part of one or more objects, just to give some examples. The data storage may be a non-volatile memory, such as an SD card.

There are a number of conventional video encoding formats. Some common video encoding formats that work with the various embodiments include: JPEG, Motion JPEG (MJPEG), High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples.

As mentioned, the input and output interface 212 is configured to act as a communication interface between the camera 108, the network 112 and one or more receiving devices such as the client 114 and the server 116. Thus, the camera 108 may receive instructions from the client 114 and may transmit video streams to the client and/or the server 116 via the input and output interface 212.

The image processing pipeline 208, the encoder 210 and the input/output interface 212 may form an image processing and encoding module 214, which is connected to the image capturing module 206. The image capturing module 206 and the image processing and encoding module 214 may be arranged as two separate units arranged at a distance from each other and in communication with each other. In such scenario the camera 108 may also be referred to as a camera system. Alternatively, the image capturing module 206 and the image processing and encoding module 214 may be arranged as a single unit comprised in the camera 108. Further, the image capturing module 206 may be movable, e.g., in pan and/or tilt directions, while the image processing and encoding module 214 may be stationary.

A method for facilitating installation of the camera 108 will now be described with reference to the flowchart of FIG. 3 and with reference to FIGS. 2 and 4. FIG. 4 schematically illustrates the image processing pipeline 208 according to embodiments. As illustrated, embodiments of the image processing pipeline 208 comprises a size estimating component 402, a providing component 404 and an alert generating component 406. However, it should be understood that one or more of the size estimating component 402, the providing component 404 and the alert generating component 406 may be arranged in the camera 108 in another way. For example, the camera 108 may comprise one or more of the size estimating component 402, the providing component 404 and the alert generating component 406 as separate units communicatively connected to each other and to other parts of the camera 108 such as the image processing pipeline 208, the encoder 210, the input and output interface 212, and the data storage 214.

Figure 3:
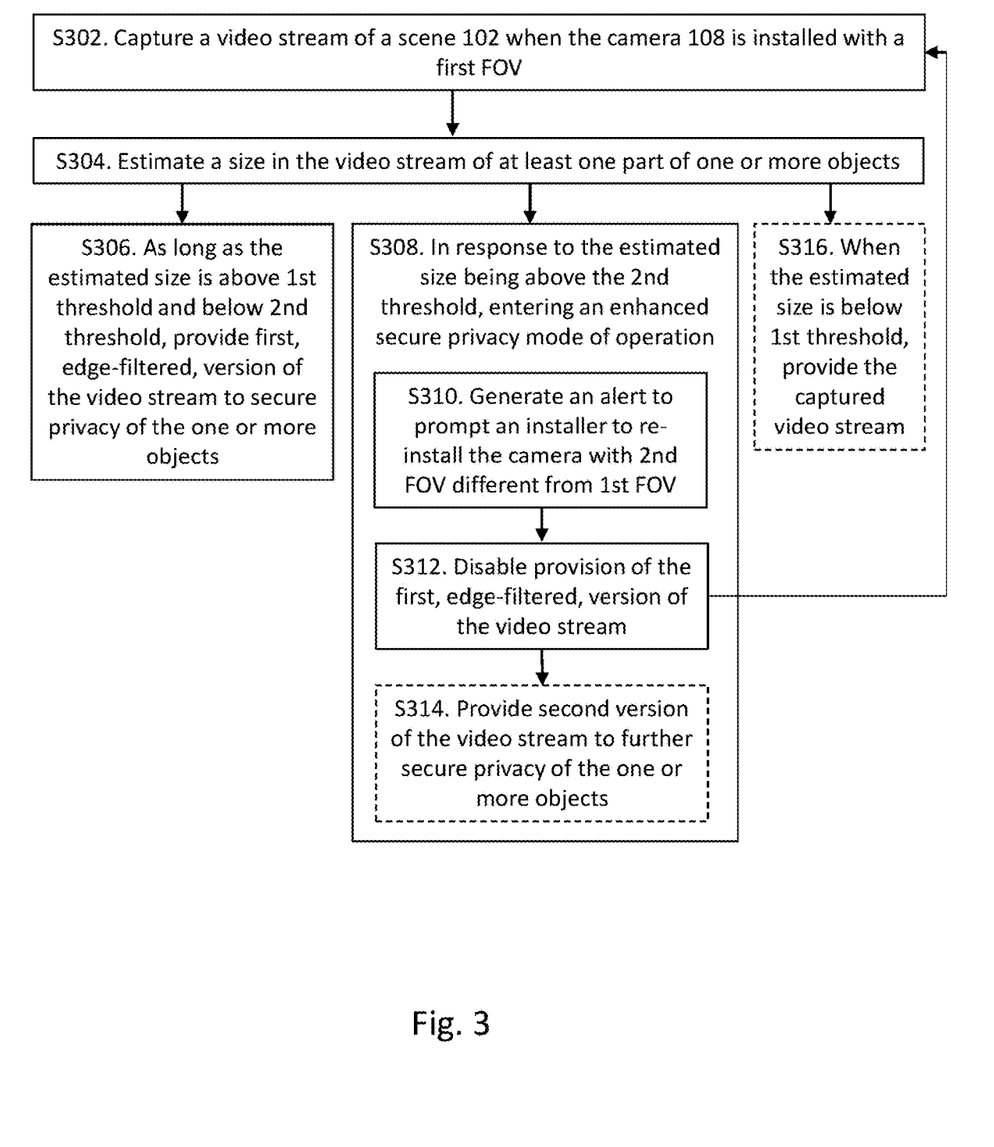
FIG. 3 is a flowchart of a method for facilitating installation of a camera according to embodiments.
Figure 4:
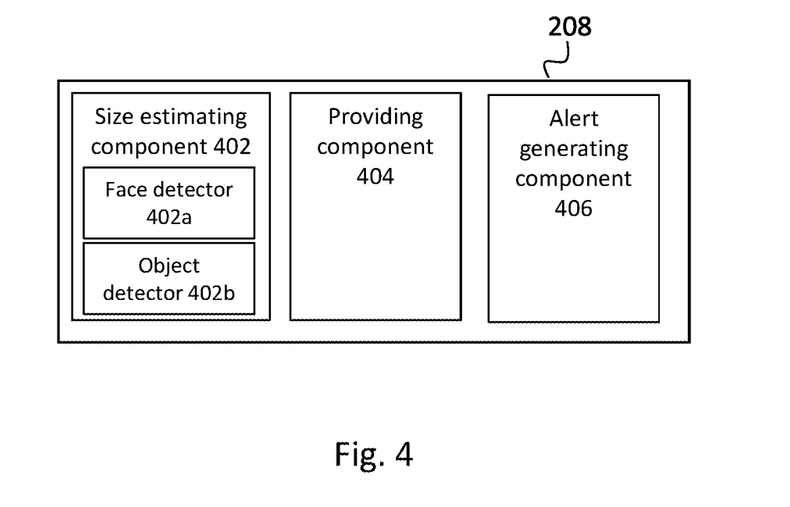
FIG. 4 schematically illustrates an image processing pipeline according to embodiments.

Further, it should be understood that the method illustrated in FIG. 3 may be performed by different parts of the camera 108, that some of the steps may be optional and that steps may be taken in another suitable order. Furthermore, in this disclosure one or more steps are described as being performed on an image frame of the captured video stream. This may be understood as one or more steps may be performed on a temporal part of the video stream.

In step S302, a video stream of the scene 102 is captured when the camera 108 is installed with a first field of view. This step is performed by the image capturing module 206, e.g., by the lens 202 and the image sensor 204.

As previously mentioned, the scene 102 comprises one or more objects 104.

As also previously mentioned, the term field of view refers to the part of the scene that is visible through the camera 108 at a particular position and orientation in space of the camera 108 and at a particular zoom setting of the camera 108. The particular position is given by the installation location and the orientation is given by the pan setting and/or tilt setting of the camera. Thus, it should be understood that the first field of view may depend on one or more different camera parameters. For example, the first field of view may depend on the installation location of the camera 108 such as height above ground, the zoom setting of the camera 108, the pan setting of the camera 108 and/or the tilt setting of the camera.

Further, and as previously mentioned, the one or more objects 104 may be any kind of object that may reveal privacy information about the object itself, about a human person being in possession of the object or about a human person being associated with the object. Thus, the object may be a human person or a part thereof, such as a face or a body part; a group of people; a vehicle or a part thereof, such as a vehicle license plate, just to give some examples.

Figure 5:
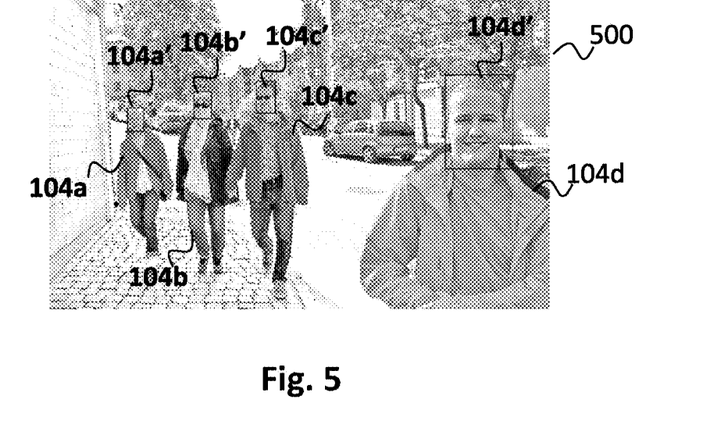
FIG. 5 schematically illustrates an image frame of a captured video stream depicting four objects.

FIG. 5 schematically illustrates an image frame 500 of a captured video stream depicting four objects 104, e.g., four individuals 104a, 104b, 104c, 104d, walking on a pavement.

In step S304, a size in the video stream of at least one part of the one or more objects 104 is estimated. This step may be performed by the size estimating component 402. The size in the video stream of the at least one part of the one or more objects may be estimated as a number of pixels the at least one part constitutes along at least one direction of the video stream. For example, the estimated size of the at least one part may be given as a number of pixels in a vertical (height) direction and/or horizontal (width) direction of an image frame of the video stream. Thus, the estimated size may be a length, a height, a width or a distance between two points given as a number of pixels. For example, the estimated size may be the number of pixels between an individual's eyes or the number of pixels between the left side of the individual's face and the right side of the face. However, the estimated size may also be the number of pixels the at least one part, e.g., an area, comprises in the image frame. In embodiments, wherein the estimated size is estimated as a size in the video stream of a face of an individual, the estimating component 402 may comprise or may be connected to a face detector (402a) configured to detect faces in video streams. However, the estimating component 402 may in addition or alternatively, comprise or may be connected to one or more other object detectors (402b) configured to detect other objects or parts thereof, such as vehicles and license plates. In FIG. 5 bounding boxes 104a', 104b', 104c', 104d' schematically illustrate the individuals' 104a-104d faces as detected by for example the face detector 402a. The size of a vehicle in the captured video may e.g., be detected by the object detector 402b estimating the distance between the vehicle's headlamps or estimating the size of the vehicle's licenses plate in the captured video stream.

In step S306 and as long as the estimated size in the video stream of the at least one part of the one or more objects 104 is above a first threshold and below a second threshold, a first, edge-filtered, version of the video stream is provided to secure privacy of the one or more objects 104 depicted in the video stream. This step is performed by the providing component 404.

In some embodiments, the providing of the first, edge-filtered, version of the video stream comprises producing the first, edge-filtered, version of the video stream by applying an edge filter to the video stream to enhance edge points in the video stream and to suppress non-edge points in the video stream. The pixel values of the video stream and the pixel values of the first, edge-filtered, version of the video stream are represented using a first number of quantization levels.

The providing of the first, edge-filtered, version of the video stream may comprise transmitting the first, edge-filtered, version of the video stream to a receiver. As previously mentioned, the receiver may be any device operatively connected, via wire or wirelessly, to the camera 108 or being comprised within the camera 108. Thus, it should be understood that the first, edge-filtered, version of the video stream may be transmitted to the client 114, the server 116 and/or to the data storage 214.

Figure 7:
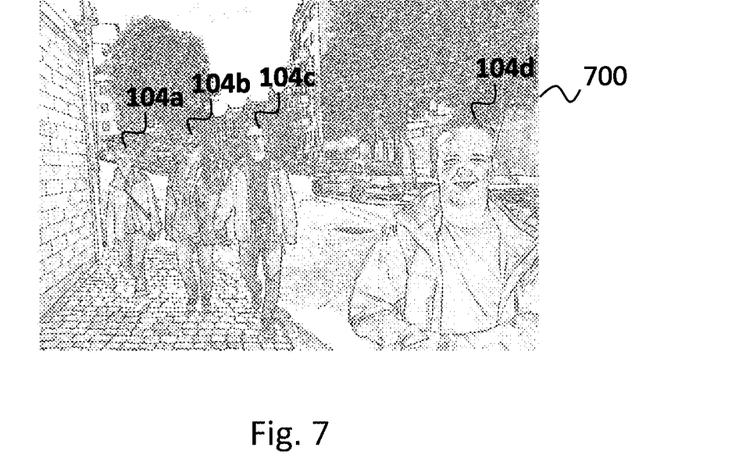
FIG. 7 schematically illustrates an edge-filtered image frame of a first, edge-filtered, version of a captured video stream depicting the four objects.

FIG. 7 schematically illustrates an edge-filtered image frame 700 of the first, edge-filtered, version of the captured video stream depicting the four objects 104, e.g., the four individuals 104a, 104b, 104c, 104d. The edge-filtered image frame 700 is obtained by applying a Sobel filter to the image frame 500 and has the highest possible spatial resolution. By the highest possible spatial resolution is meant that the spatial resolution of the edge-filtered image frame is the same as the corresponding image frame of the captured video stream. In other words, the spatial resolution of the edge-filtered image frame 700 is the same as the spatial resolution of the image frame 500. As can be seen in FIG. 7, the privacy of the individuals is revealed as they are coming closer to the camera and thus, when the size of for example their faces in the image frame 700 increases. Therefore, before the privacy is revealed, e.g., already when the privacy of the one or more objects is at risk of being revealed, the providing of the first, edge-filtered, version of the captured video stream should be disabled.

Therefore, in step S308 and in response to the estimated size in the video stream of the at least one part of the one or more objects 104 being above the second threshold indicating that privacy of at least one object is at risk of being revealed, the camera 108 enters an enhanced secure privacy mode of operation.

When in the enhanced secure privacy mode of operation, in step S310 an alert is generated to prompt an installer to re-install the camera 108 with a second field of view different from the first field of view, and in step S312 provision of the first, edge-filtered, version of the video stream is disabled. The provision of the first, edge-filtered, version of the video stream may be disabled for a predetermined period of time, e.g., for a period of time corresponding to one or more days, or to a period of time expected to be needed for the re-installation of the camera 108.

It should be understood that the re-installation of the camera 108 in order to obtain the second, different, field of view may comprise changing the camera settings from a first pan level to a second, different, pan level, and/or from a first tilt setting to a second, different, tilt setting and/or from a first zoom setting to a second, different, zoom setting. The second zoom setting is preferably a zoom out setting as compared to the first zoom setting. Alternatively, or additionally, the re-installation may comprise that the camera 108 is moved from a first physical location to a second, different, physical location, i.e., from a mounting on a pole on the ground to a mounting up high on a high building.

After the re-installation of the camera 108 with the second field of view, the method steps may be repeated from step S302 now with the second field of view being a new first field of view, i.e., the first field of view mentioned in the steps S302-S312.

Step S310 may be performed by the alert generating component 406, and step S312 may be performed by the providing component 404.

In some embodiments, the disabling of the provision of the first, edge-filtered, version of the video stream comprises disabling transmission of the first, edge-filtered, version of the video stream to the receiver. This means that in some embodiments, the camera 108 stops recording the first, edge-filtered, version of the video stream. For example, the first, edge-filtered, version of the video stream is not stored in the data storage 214.

Alternatively, in some embodiments, the disabling of the provision of the first, edge-filtered, version of the video stream comprises disabling the camera from capturing the video stream. This may be the case, when no second version of the video stream is needed or desired and thus the camera 108 is inactivated when the first, edge-filtered, version of the video stream cannot guarantee privacy of the one or more objects. In such case, the image capturing module 206, e.g., the lens 202 and/or the image sensor 204, may be disabled from capturing the video stream.

In some embodiments, the disabling of the provision of the first, edge-filtered, version of the video stream comprises disabling an image sensor of the camera to convey image information used to make the captured video stream. Thus, in some cases the camera 108 is disabled by disabling the image sensor 204 from conveying image frames used to make the captured video stream. For example, the image sensor 204 may be disabled from conveying image frames to the image processing and encoding module 214 of the camera 108.

In an optional step S314, the enhanced secure privacy mode of operation further comprises, providing a second version of the video stream in which the privacy of the one or more objects 104 is further secured. This step may be performed during the predetermined period of time mentioned in step S312 above, and during which period of time the provision of the first, edge-filtered, version of the video stream is disabled awaiting re-installation of the camera 108. As will be described below, the provisioning of the second version of the video stream may be accomplished in different ways.

In a first alternative way, the providing of the second version of the video stream comprises producing the second version of the video stream by applying a privacy mask to at least a part of the video stream to secure privacy of the one or more objects 104 depicted in the video stream. The privacy mask may be a colour mask or a mosaic (pixel) mask. For example, the privacy mask masks the identities of objects in live and recorded video streams by comparing a live camera view with a set background scene and applying dynamic masking to areas of change—essentially moving objects. Further, it may be possible to set the level of masking required. The colour masking may provide the greatest privacy protection of the two while enabling viewing of movements. Mosaic masking shows moving objects in a low resolution and it may be easier to distinguish forms by seeing an object's different colours as compared to the colour mask applying a single masking colour to the entire object.

Figure 6:
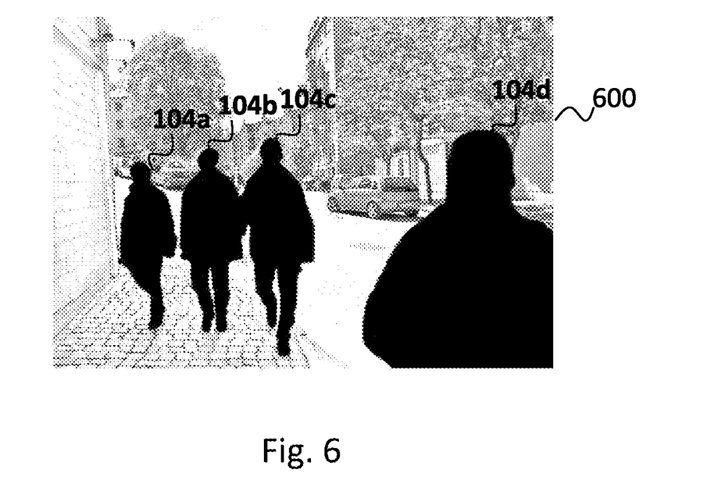
FIG. 6 schematically illustrates a privacy masked image frame of a captured video stream securing privacy of four objects.

FIG. 6 schematically illustrates a privacy masked image frame 600 of the captured video stream securing privacy of the four objects 104, e.g., the four individuals 104a, 104b, 104c, 104d.

In a second alternative way, the providing of the second version of the video stream comprises producing the second version of the video stream as a second, edge-filtered, version of the video stream by, before applying the edge filter to the video stream, reducing the spatial resolution of the video stream to reduce the size in the video stream of the at least one part of the one or more objects to be below the second threshold. As previously mentioned, by reducing the spatial resolution of the video stream, before applying the edge filter, such that the size in the video stream of the at least one part of the one or more objects is below the second threshold, the privacy of the one or more objects is secured in the second, edge-filtered, version of the video stream.

Figure 8:
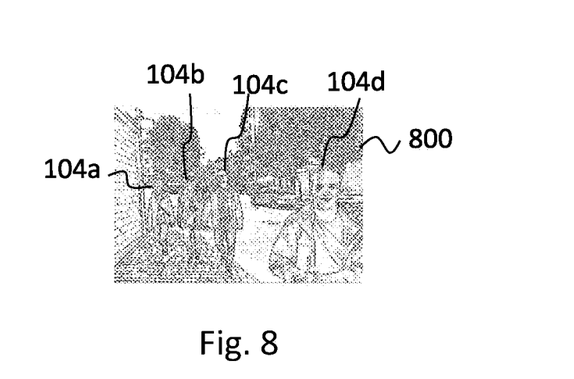
FIG. 8 schematically illustrates an example of an edge-filtered image frame of a second, edge-filtered, version of a captured video stream.
Figure 9:
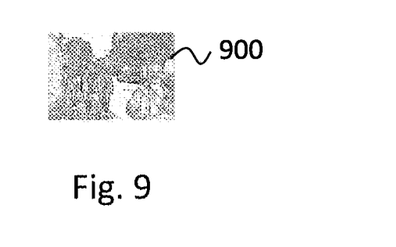
FIG. 9 schematically illustrates an example of an edge-filtered image frame of another second, edge-filtered, version of a captured video stream.

FIG. 8 schematically illustrates an example of an edge-filtered image frame 800 of the second, edge-filtered, version of the captured video stream. The spatial resolution of the edge-filtered image frame 800 is half the spatial resolution of the edge-filtered image frame 700. As can be seen by comparing the edge-filtered image frames 700, 800, the size of the edge-filtered image frame 800 is reduced as compared to the image size of the edge-filtered image frame 700. However, as seen in the edge-filtered image frame 800 the privacy of the four individuals is not secured. In order to secure privacy, the spatial resolution should be reduced even more before applying the edge-filter in order to reduce the size in the video stream of the at least one part of the one or more objects to be below the second threshold. FIG. 9 schematically illustrates an example of an edge-filtered image frame 900 of another second, edge-filtered, version of the captured video stream. The spatial resolution of the edge-filtered image frame 900 is a fourth of the spatial resolution of the edge-filtered image frame 700. As is illustrated in FIG. 9, the privacy of the four individuals is secured in the edge-filtered image frame 900.

In a third alternative way, the providing of the second version of the video stream comprises producing the second version of the video stream as a second, edge-filtered, version of the video stream by, before applying the edge filter to the video stream, reducing the number of quantization levels used to represent pixel values of the video stream from the first number of quantization levels to a second number of quantization levels.

It should be understood that pixel values of the second, edge-filtered, version of the video stream may be represented using the second number of quantization levels.

However, it should also be understood that the number of possible quantization levels may be increased again to correspond to the first number of quantization levels and that in such scenario only a number of the quantization levels corresponding to the second number of quantization levels is used to represent the pixel values of the second, edge-filtered, version of the video stream. For example, if the first number of quantization levels of the video stream corresponds to 256 (8 bits), and the second number of quantization levels is 16 (4 bits), the second, edge-filtered, version of the video stream may be a 4 bits video stream wherein the 16 quantization levels are used to represent pixel values or its number of quantization levels may be increased to 256 (8 bits) but only 16 quantization levels out of the 256 quantization levels are used to represent pixel values.

As previously set forth, by reducing the number of quantization levels used in the video stream from the first number of quantization levels to a second, lower, number of quantization levels, the granular distortion in the second, edge-filtered, version of the video stream will be increased due to the larger number of intensities to be represented by each quantization level in the second number of quantization levels as compared to the number of intensities to be represented by each quantization level in the first number of quantization levels. Thanks to a larger granular distortion, the privacy of the one or more objects depicted in the second, edge-filtered, version of the video stream is secured.

Figure 11:
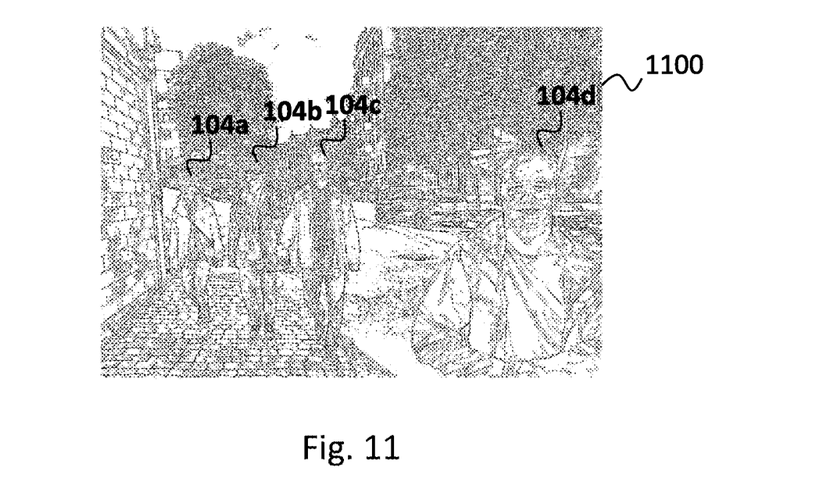
FIG. 11 schematically illustrates an example of an edge-filtered image frame 1100 of a second, edge-filtered, version of a captured video stream, wherein the number of quantization levels is reduced.

FIG. 11 schematically illustrates an example of an edge-filtered image frame 1100 of a second, edge-filtered, version of the captured video stream, wherein the number of quantization levels has been reduced in order to secure privacy. In the exemplifying figure, the number of quantization levels in the edge-filtered image frame 1100 is 8 (3 bits) as compared to the 256 quantization levels (8 bits) in the edge-filtered image frame 700.

In a fourth alternative way, the providing of the second version of the video stream comprises producing the second version of the video stream as a second, edge-filtered, version of the video stream by, reducing the spatial resolution of the first, edge-filtered, version of the video stream to obtain the second, edge-filtered, version of the video stream wherein the size of the at least one part of the one or more objects is below the second threshold. As previously mentioned, by reducing the spatial resolution of the first, edge-filtered, version of the video stream the number of pixels composing the one or more image frames of the first, edge-filtered, version of the video stream is reduced. Further, by reducing the spatial resolution of the first, edge-filtered, version of the video stream such that the size in the second, edge-filtered, version of the video stream of the at least one part of the one or more objects is below the second threshold, the privacy of the one or more objects is secured in the second, edge-filtered, version of the video stream when the privacy could not be guaranteed in the first, edge-filtered, version of the video stream.

Figure 10:
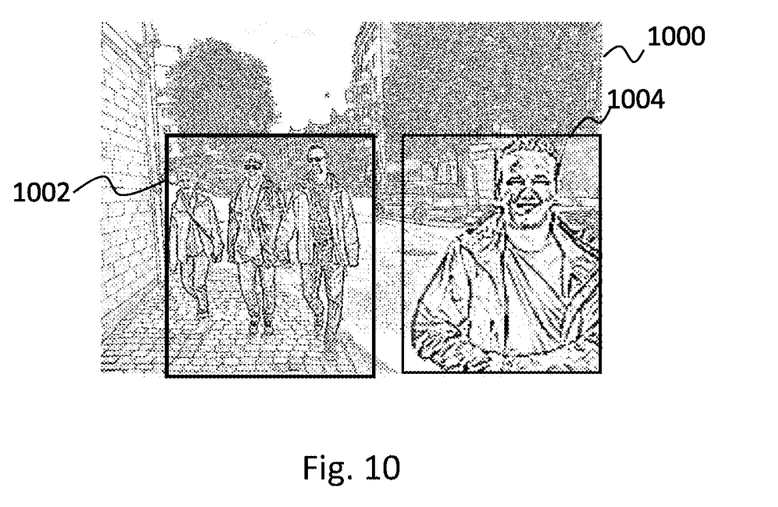
FIG. 10 schematically illustrates an example of an edge-filtered image frame of an edge-filtered version of a captured video stream.

In order to secure privacy for objects depicted in different areas of the captured video stream, a first image resolution of a first area of the edge-filtered image frame depicting a first object may be different from a second image resolution of a second area of the edge-filtered image frame depicting a second object. The first image resolution of the first area relates to an amount of image details in the first area, and in correspondence, the second image resolution of the second area relates to an amount of image details in the second area. The first and second image resolutions may be obtained by downscaling the first and second areas differently and then upscaling them to comprise their original number of pixels. As previously mentioned, downscaling reduces the number of pixels causing image details to be lost, and upscaling increases the number of pixels but cannot recover lost image details. Thus, by downscaling the first and second areas differently different amount of image details will be lost in the first and second areas, resulting in different amount of anonymization. By, after downscaling, upscaling the first and second areas to their original number of pixels, the first and second areas will have their original size in the edge-filtered image frame. FIG. 10 schematically illustrates an example of an edge-filtered image frame 1000 of a second edge-filtered version of the captured video stream. In this example, the first resolution of a first area 1002 of the edge-filtered image frame 1000 is half the image resolution of the edge-filtered image frame 700 and the second resolution of a second area 1004 of the edge-filtered image frame 1000 is a fourth of the image resolution of the edge-filtered image frame 700.

Figure 12:
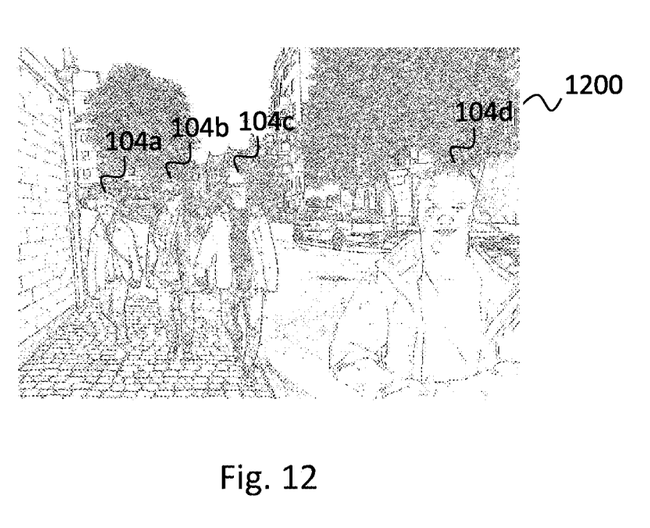
FIG. 12 schematically illustrates an example of an edge-filtered image frame 1200 of a second, edge-filtered, version of a captured video stream.

In a fifth alternative way, the providing of the second version of the video stream comprises producing the second version of the video stream as a second, edge-filtered, version of the video stream by representing edge points having an edge strength below an edge strength threshold in the first, edge-filtered, version of the video stream as non-edge points in the second, edge-filtered, version of the video stream. FIG. 12 schematically illustrates an example of an edge-filtered image frame 1200 of a second, edge-filtered, version of a captured video stream, wherein edge points having an edge strength below the edge strength threshold is suppressed by representing them as non-edge points in the second, edge-filtered, version of the video stream. Thereby, the privacy of the one or more objects 104 is increased. It should be understood that by increasing the edge strength threshold further, a further anonymization of the one or more objects 104 will be obtained and thus also an even more secure privacy of the one or more objects 104 will be obtained.

In an optional step S316 and when the estimated size in the video stream of the at least one part is below the first threshold, the captured video stream is provided. The captured video stream may be provided by transmitting the captured video stream to a receiver. As previously, mentioned the receiver may be any device operatively connected, via wire or wirelessly, to the camera 108 or being comprised within the camera 108. Thus, it should be understood that the captured video stream may be transmitted to the client 114, the server 116 and/or to the data storage 214.

Embodiments also relates to the camera 108 for facilitating installation thereof. The camera 108 comprises the image capturing module 206 configured to capture a video stream of a scene 102 when the camera 108 is installed with a first field of view, which scene 102 comprises one or more objects 104.

The camera 108 comprises also the size estimating component 402 configured to estimate a size in the video stream of at least one part of the one or more objects 104.

Further, the camera 108 comprises the providing component 404 configured to, as long as the estimated size in the video stream of the at least one part of the one or more objects 104 is above a first threshold and below a second threshold, provide a first, edge-filtered, version of the video stream to secure privacy of the one or more objects depicted in the video stream.

The providing component 404 is configured to detect and enhance edge points and to suppress non-edge points in the captured video stream, and to provide an edge-filtered version of the captured video stream, e.g., the first and second, edge-filtered, version of the captured video stream as described above. The providing component 404 may be or may comprise an edge detector configured to provide the edge-filtered versions of the captured video stream.

Furthermore, the providing component 404 is configured to, when the camera 108 is in the enhanced secure privacy mode of operation, disable provision of the first, edge-filtered, version of the video stream.

In some embodiments, the providing component 404 is configured to provide a second version of the captured video stream, which second version may be a privacy masked version or a second, edge-filtered, version of the captured video stream.

The providing component 404 may also be configured to provide the captured video stream when the estimated of the size in the video stream of the at least one part of the one or more objects 104 is below the first threshold.

The camera 108 is configured to, in response to the estimated size in the video stream of the at least one part of the one or more objects 104 being above the second threshold indicating that privacy of at least one object is at risk of being revealed, enter the enhanced secure privacy mode of operation.

Further, the camera 108 comprises the alert generating component 406 configured to, when the camera 108 is in the enhanced secure privacy mode of operation, generate an alert to prompt an installer to re-install the camera with a second field of view different from the first field of view.

Embodiments also relates to a non-transitory computer-readable medium having stored thereon computer code instructions adapted to carry out embodiments of the method described herein when executed by a device having processing capability.

As described above, the camera 108 may be configured to implement a method for facilitating installation thereof. For this purpose, the camera 108 may include circuitry which is configured to implement the various method steps described herein.

In a hardware implementation, the circuitry may be dedicated and specifically designed to implement one or more of the method steps. The circuitry may be in the form of one or more integrated circuits, such as one or more application specific integrated circuits or one or more field-programmable gate arrays. By way of example, the camera 108 may hence comprise circuitry which, when in use, estimates the size in the video stream of at least one part of the one or more objects, and which, when in use and as long as the estimated size in the video stream of the at least one part of the one or more objects is above a first threshold and below a second threshold, provides a first, edge-filtered, version of the video stream to secure privacy of the one or more objects depicted in the video stream. The camera 108 may further comprise circuitry which, when in use and in response to the estimated size in the video stream of the at least one part of the one or more objects being above the second threshold indicating that privacy of at least one object is at risk of being revealed, enters an enhanced secure privacy mode of operation. Furthermore, the camera 108 may comprise circuitry which, when in use and when in the enhanced secure privacy mode, generates an alert to prompt an installer to re-install the camera with a second field of view different from the first field of view, and disables provision of the first, edge-filtered, version of the video stream.

In a software implementation, the circuitry may instead be in the form of a processor, such as a microprocessor, which in association with computer code instructions stored on a (non-transitory) computer-readable medium, such as a non-volatile memory, causes the camera 108 to carry out any method disclosed herein. Examples of non-volatile memory include read-only memory, flash memory, ferroelectric RAM, magnetic computer storage devices, optical discs, and the like. In a software case, each of the method steps described above may thus correspond to a portion of computer code instructions stored on the computer-readable medium, that, when executed by the processor, causes the camera 108 to carry out any method disclosed herein.

It is to be understood that it is also possible to have a combination of a hardware and a software implementation, meaning that some method steps are implemented in hardware and others in software.

It will be appreciated that a person skilled in the art can modify the above-described embodiments in many ways and still use the advantages as shown in the embodiments above. For example, the camera 108 does not need to be a single unit comprising the image capturing module 206 and the image processing and encoding module 214 at one location but it could be a virtual unit, wherein image capturing part 206 and the image processing and encoding module 214 operate together but they are provided at different locations. Further, the size estimating component 402, the providing component 404 and the alert generating component 406 do not need to be arranged in the image processing pipeline 208, but could be arranged as separate units of the image processing and encoding module 214 and could be arranged in communication with the image processing pipeline 208, the encoder 210, the input and output interface 212, and the data storage 214. Thus, the concepts should not be limited to the shown embodiments but should only be defined by the appended claims. Additionally, as the skilled person understands, the shown embodiments may be combined.

The invention claimed is:

1. A method in a camera for facilitating installation thereof, the method comprising:
    capturing a video stream of a scene when the camera is installed with a first field of view, which scene comprises one or more objects,
    estimating a size in the video stream of at least one part of the one or more objects,
    as long as the estimated size in the video stream of the at least one part of the one or more objects is above a first threshold and below a second threshold, providing a first, edge-filtered, version of the video stream to secure privacy of the one or more objects depicted in the video stream; and
    in response to the estimated size in the video stream of the at least one part of the one or more objects being above the second threshold indicating that privacy of at least one object is at risk of being revealed, entering an enhanced secure privacy mode of operation comprising:
    generating an alert to prompt an installer to re-install the camera with a second field of view different from the first field of view, and
    disabling provision of the first, edge-filtered, version of the video stream, wherein the first threshold and the second threshold are related to an amount of image detail in each of the one or more objects.

2. The method of claim 1, wherein the enhanced secure privacy mode of operation further comprises:
    providing a second version of the video stream in which the privacy of the one or more objects is further secured.

3. The method of claim 2, wherein providing the second version of the video stream comprises:
    producing the second version of the video stream by applying a privacy mask to at least a part of the video stream to secure privacy of the one or more objects depicted in the video stream.

4. The method of claim 1, wherein providing the first, edge-filtered, version of the video stream comprises:
    producing the first, edge-filtered, version of the video stream by applying an edge filter to the video stream to enhance edge points in the video stream and to suppress non-edge points in the video stream, wherein pixel values of the video stream are represented using a first number of quantization levels.

5. The method of claim 4, wherein providing the second version of the video stream comprises:
    producing the second version of the video stream as a second, edge-filtered, version of the video stream by:
    before applying the edge filter to the video stream, reducing the spatial resolution of the video stream to reduce the size in the video stream of the at least one part of the one or more objects to be below the second threshold.

6. The method of claim 4, wherein providing the second version of the video stream comprises:
    producing the second version of the video stream as a second, edge-filtered, version of the video stream by:
    before applying the edge filter to the video stream, reducing the number of quantization levels used to represent pixel values of the video stream from the first number of quantization levels to a second number of quantization levels.

7. The method of claim 1, wherein providing the second version of the video stream comprises:
    producing the second version of the video stream as a second, edge-filtered, version of the video stream by:
    reducing the spatial resolution of the first, edge-filtered, version of the video stream to obtain the second, edge-filtered, version of the video stream wherein the size of the at least one part of the one or more objects is below the second threshold.

8. The method of claim 1, wherein providing the second version of the video stream comprises:
    producing the second version of the video stream as a second, edge-filtered, version of the video stream by:
    representing edge points having an edge strength below an edge strength threshold in the first, edge-filtered, version of the video stream as non-edge points in the second, edge-filtered, version of the video stream.

9. The method of claim 1, wherein providing the first, edge-filtered, version of the video stream comprises:
    transmitting the first, edge-filtered, version of the video stream to a receiver; and
    wherein disabling provision of the first, edge-filtered, version of the video stream comprises:
    disabling transmission of the first, edge-filtered version of the video stream to the receiver.

10. The method of claim 1, wherein disabling provision of the first, edge-filtered, version of the video stream comprises:
    disabling the camera from capturing the video stream.

11. The method of claim 1, wherein disabling provision of the first, edge-filtered, version of the video stream comprises:
    disabling an image sensor of the camera to convey image frames used to make the captured video stream.

12. The method of claim 1, further comprising:
    when the estimated size in the video stream of the at least one part of the one or more objects is below the first threshold, providing the captured video stream.

13. A camera for facilitating installation thereof, the camera comprises:
    an image capturing module comprising a lens and an image sensor configured to capture a video stream of a scene when the camera is installed with a first field of view, which scene comprises one or more objects,
    one or more processors and one or more non-transitory computer-readable storage media, the non-transitory computer-readable storage media having stored thereon at least:
    a size estimating component configured to estimate a size in the video stream of at least one part of the one or more objects, a providing component configured to, as long as the estimated size in the video stream of the at least one part of the one or more objects is above a first threshold and below a second threshold, provide a first, edge-filtered, version of the video stream to secure privacy of the one or more objects depicted in the video stream; and in response to the estimated size in the video stream of the at least one part of the one or more objects being above the second threshold indicating that privacy of at least one object is at risk of being revealed, the camera is configured to enter an enhanced secure privacy mode of operation wherein:

an alert generating component is configured to generate an alert to prompt an installer to re-install the camera with a second field of view different from the first field of view, and wherein the providing component is configured to disable provision of the first, edge-filtered, version of the video stream, wherein the first threshold and the second threshold are related to an amount of image detail in each of the one or more objects.

14. A non-transitory computer-readable medium having stored thereon computer code instructions adapted to carry out a method, when executed by a device having processing capability, the method comprising:

capturing a video stream of a scene when the camera is installed with a first field of view, which scene comprises one or more objects, estimating a size in the video stream of at least one part of the one or more objects, as long as the estimated size in the video stream of the at least one part of the one or more objects is above a first threshold and below a second threshold, providing a first, edge-filtered, version of the video stream to secure privacy of the one or more objects depicted in the video stream; and in response to the estimated size in the video stream of the at least one part of the one or more objects being above the second threshold indicating that privacy of at least one object is at risk of being revealed, entering an enhanced secure privacy mode of operation comprising:

generating an alert to prompt an installer to re-install the camera with a second field of view different from the first field of view, and disabling provision of the first, edge-filtered, version of the video stream, wherein the first threshold and the second threshold are related to an amount of image detail in each of the one or more objects.

* * * * *